Figure 1:
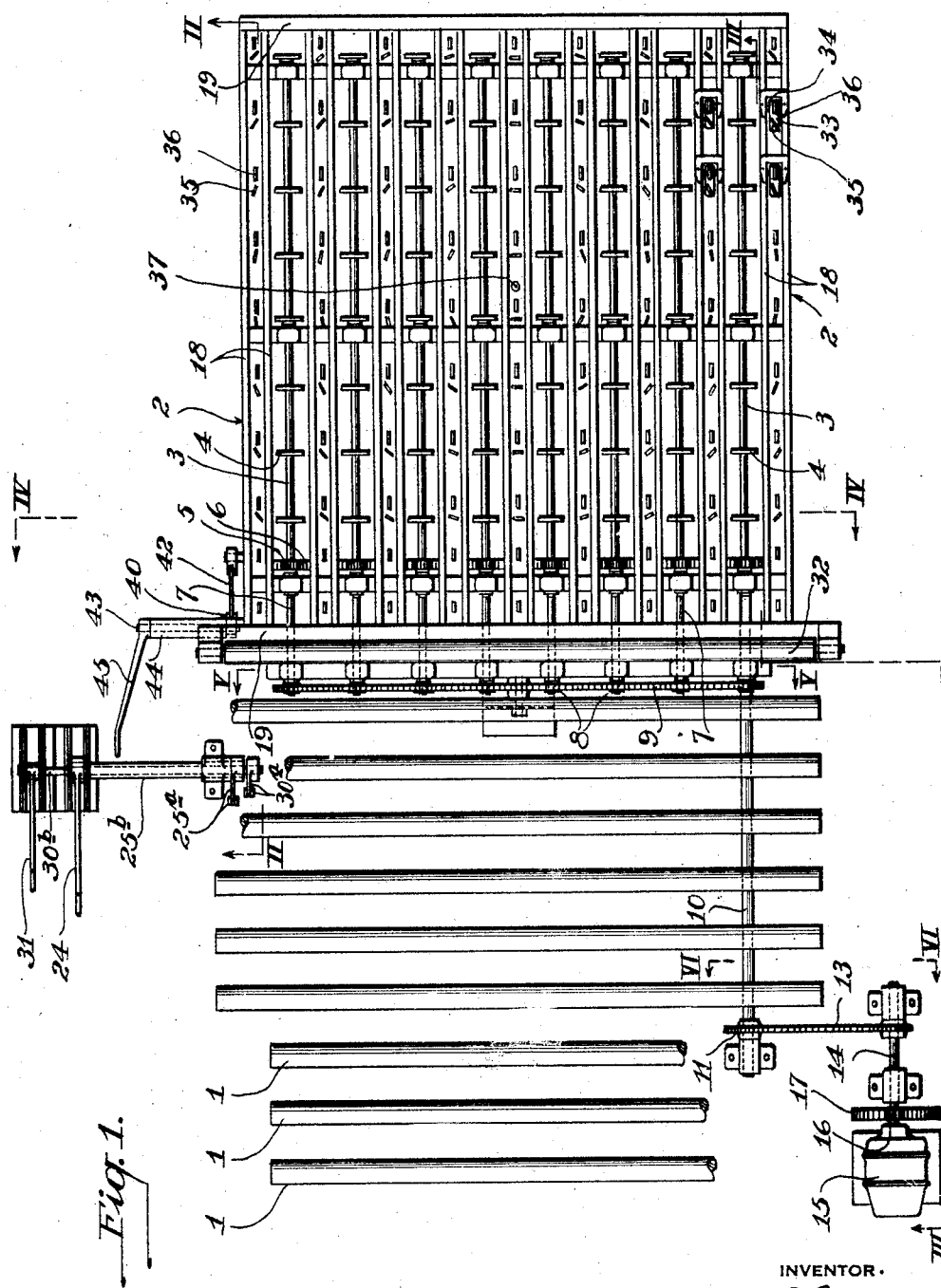

March 8, 1927.  A. E. EVANS  1,620,014

APPARATUS FOR CRACKING OFF AND HANDLING CONTINUOUSLY FORMED SHEET GLASS

Filed July 20, 1926  5 Sheets-Sheet 1

INVENTOR.
Albert E. Evans
by
James C. Bradley
atty

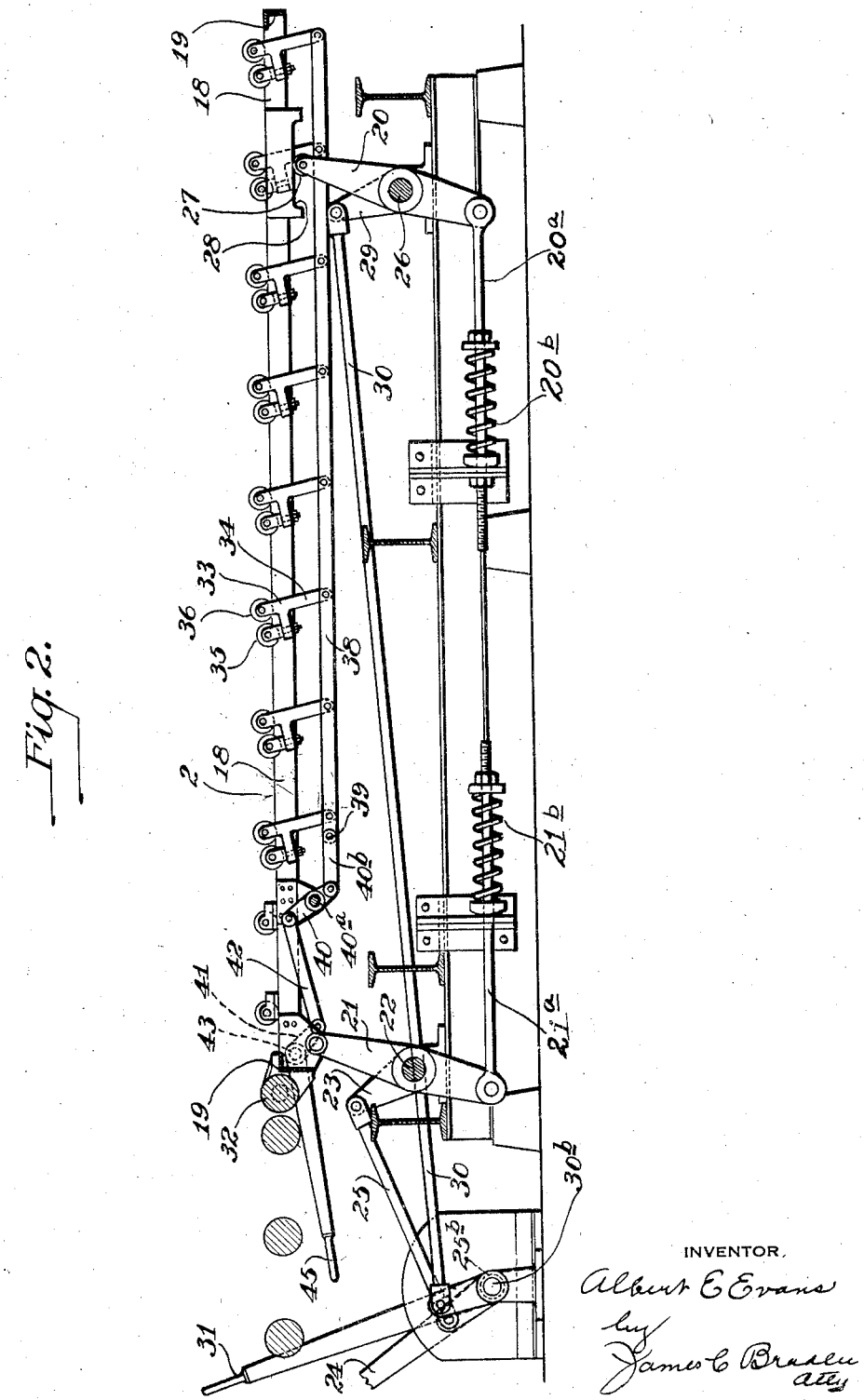

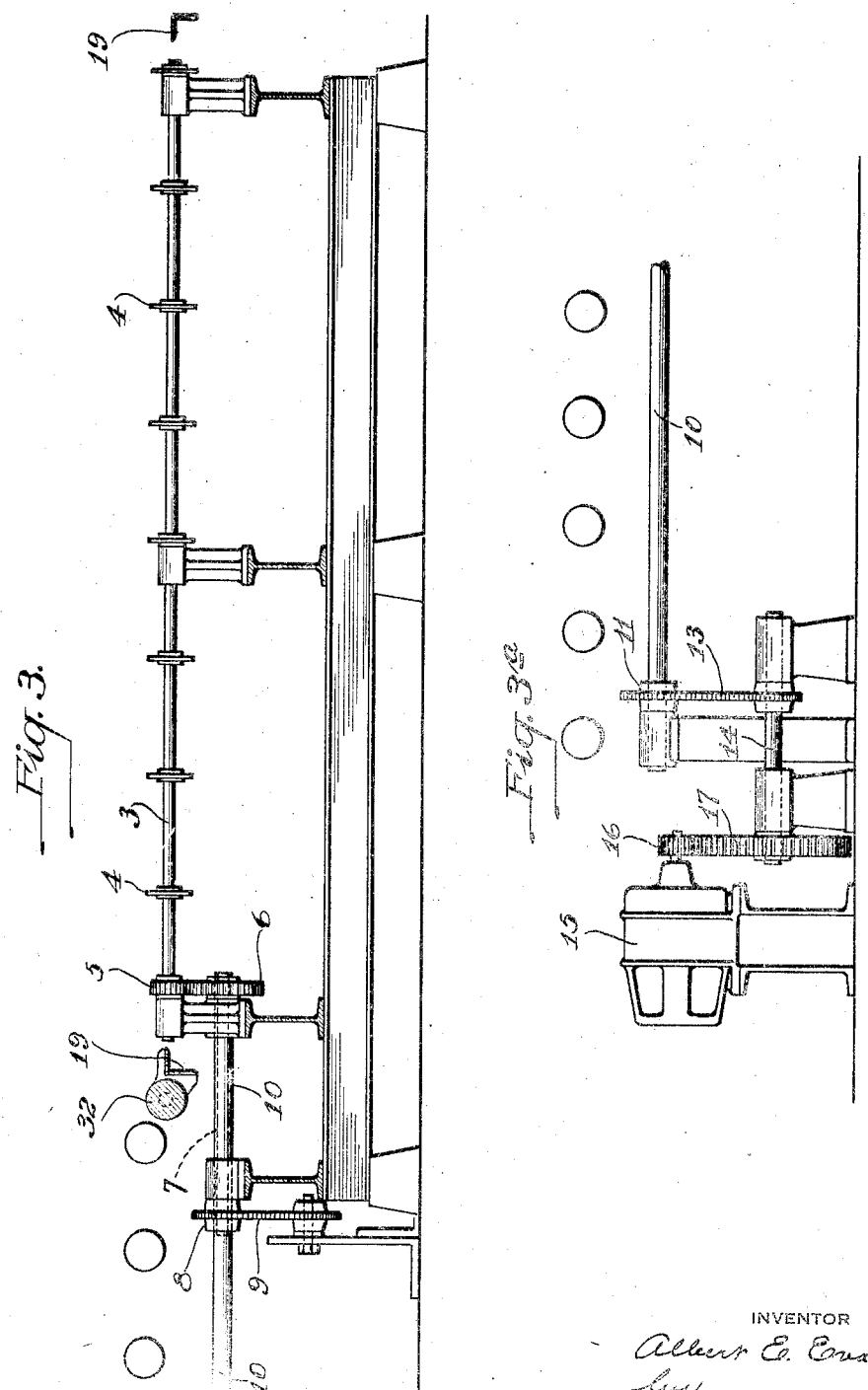

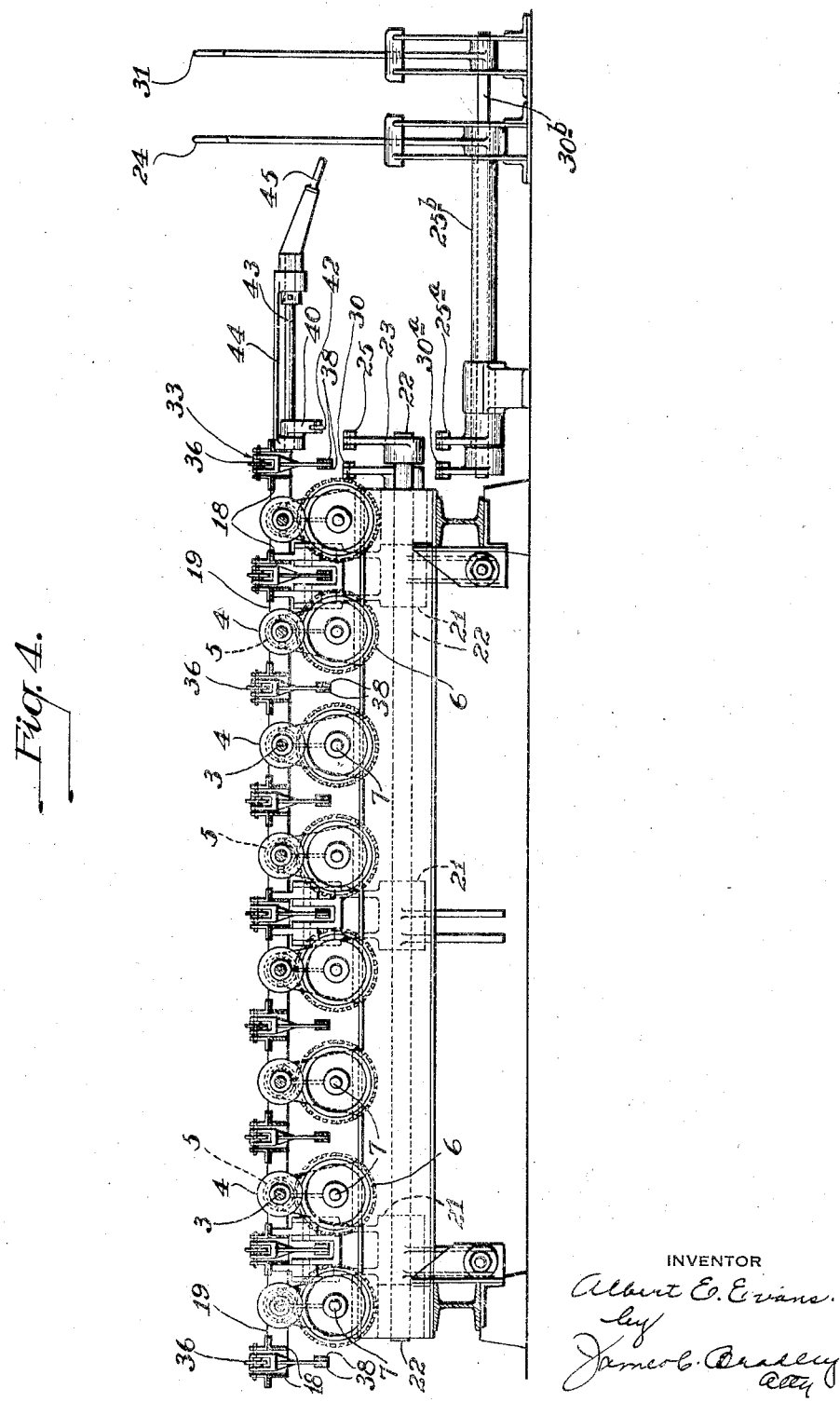

March 8, 1927.
A. E. EVANS
1,620,014
APPARATUS FOR CRACKING OFF AND HANDLING CONTINUOUSLY FORMED SHEET GLASS
Filed July 20, 1926   5 Sheets-Sheet 5
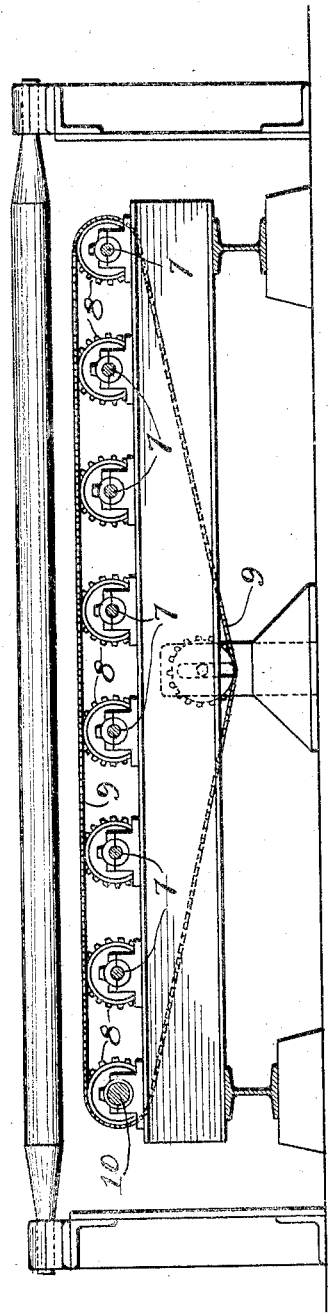
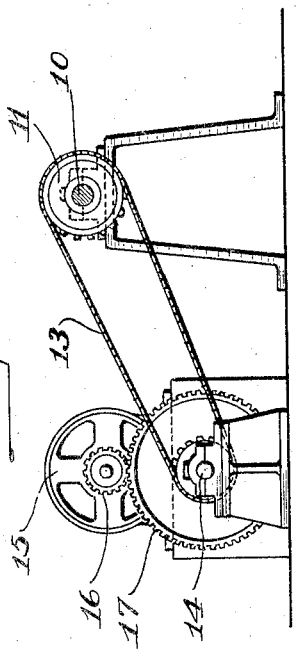
INVENTOR
Albert E. Evans.
by James E. Bradley
att.

Patented Mar. 8, 1927.

1,620,014

UNITED STATES PATENT OFFICE.

ALBERT E. EVANS, OF PITTSBURGH, PENNSYLVANIA, ASSIGNOR TO PITTSBURGH PLATE GLASS COMPANY, A CORPORATION OF PENNSYLVANIA.

APPARATUS FOR CRACKING OFF AND HANDLING CONTINUOUSLY-FORMED SHEET GLASS.

Application filed July 20, 1926. Serial No. 123,639.

The invention relates to apparatus for cracking off and handling the sections of a continuously formed sheet or ribbon of glass at the outlet end of the leer through which the ribbon or sheet is carried. In the principle of its operation, it is similar to the apparatus of my Patent No. 1,569,079 of January 12, 1926, but includes a further improvement adapting the apparatus to the handling of very wide sheets of glass. When such sheets are placed upon the surfacing tables, which are mounted for movement parallel with the path of movement of the ribbon, it is necessary to shift them to a position at right angles to the position which they occupy when they are cracked off, and the present improvement provides the means whereby the sheets may be shifted upon the table through the 90 degree angle easily and conveniently preliminary to transferring them laterally to the cutting tables, lying alongside the cracking off table, as shown and described in my patent above referred to. One embodiment of the invention is illustrated in the accompanying drawings, in which:

Figure 1 is a plan view, somewhat diagrammatic, showing the construction. Fig. 2 is a section on the line II—II of Fig. 1. Fig. 3 and Fig. 3ª are together a partial section and partial side elevation on the line III—III of Fig. 1. Fig. 4 is a section on the line IV—IV of Fig. 1. Fig. 5 is a section on the line V—V of Fig. 1. And Fig. 6 is a section on the line VI—VI of Fig. 1.

Referring to the drawings, 1, 1, 1, etc. are the driven rolls at the outlet end of the leer (not shown), which carry the continuous sheet or ribbon onto the cracking off table to the right of such rolls. The table includes a vertically movable section 2, which receives the end of the ribbon or sheet, and a fixed table or section to which the sheet is transferred when the section 2 is lowered after the cracking off operation, the construction, in this particular case, following that of my patent heretofore referred to. The fixed section or table is made up of the parallel driven shafts 3, 3, 3, etc., each provided with the plurality of rollers 4, 4, 4, etc. When the table or section 2 is lowered to transfer the sheet to the rollers 4, 4, 4, the rotation of these rollers carries the sheet laterally from the table onto a cutting table located at one side upon which the sheet is trimmed. The shafts 3, 3, 3, etc. are provided at their ends with spur gears 5, 5, 5, etc. (Figs. 1 and 4) and meshing with the spur gears 6, 6, 6, etc. carried by parallel countershafts 7, 7, 7 lying beneath the shafts 3. These countershafts are provided with sprockets 8, 8, 8, etc. at their ends (Figs. 1 and 5) driven by the chain 9, such chain in turn being driven from the shaft 10 having at its left hand end a sprocket 11 driven by the chain 13. The chain 13 is driven from the countershaft 14, which receives its driving power from the motor 15 through the intermediary of the reduction gears 16 and 17.

The movable table or section 2 is made up of a plurality of longitudinally extending angles 18, 18, 18, etc. and transverse angles 19, 19 at the ends of the table. The table is supported and moved vertically by three pairs of lever arms at each end of the table, the arms at the right hand end of the table being indicated by the numerals 20 and those at the left hand end by the numerals 21. The levers 21 are mounted upon a transverse shaft 22 having keyed thereto the lever arm 23, and this lever arm is operated from the handle 24 by means of the connecting rod 25 and crank 25ª carried by the hollow shaft 25ᵇ to which the handle 24 is keyed. The levers 20 are mounted upon a transverse shaft 26 and have their upper ends provided with rollers 27 adapted to ride in the slots 28 on the lower side of the table frame. These levers 20 are swung by means of the lever 29 keyed to the shaft and connected by means of the rod 30 with a crank 30ª carried by the shaft 30ᵇ. The shaft 30ᵇ is operated by the handle 31. In operation, after the glass sheet has been received upon the table section 2, the levers 20 are swung forward, thus causing the table to tilt downwardly at its forward end, so that the weight of the glass cracks the sheet off at its rear end above the roll 32, such glass having been previously scored along the line at which it is desired to have it separated. After this tilting movement, the levers 21 are swung forward to move the table forward bodily and give clearance between the rear end of the sheet and the front end of the oncoming ribbon or sheet.

Mounted between the pairs of longitudinally extending angle irons 18, 18, etc. are the roller units 33, 33, etc., each comprising a lever 34 and a pair of rollers 35 and 36. These units are pivoted for rocking movement so that in one position, the rolls 35 are uppermost and engage and support the glass, and in another position, the rolls 36 are uppermost and engage and support the glass. When the units are in the position shown in Fig. 2, the rollers 36 are uppermost. This set of rolls have their planes of rotation parallel to the line of movement of the glass and are employed to support the glass as it moves onto the table preliminary to the cracking off operation. The other set of rolls have their axes of rotation arranged radially with respect to the center point 37 of the table, and these rolls come into play when it is desired to rotate the sheet about its axes 90 degrees, the roller units being shifted at this time so that the rollers 35 are uppermost, and the rollers 36 are out of engagement with the glass. In order to swing the roller units, the levers 34 are connected to the parallel bars 38, 38, etc. extending longitudinally of the table and connected at their rear ends to a transverse shaft 39. This shaft is connected to a suitable lever 40 carried by a transverse shaft 41$^a$, by a bar 40$^b$ and the lever 40 is operated from a crank 41 by means of the connecting rod 42. The shaft 43 which carries the crank 41 is supported in a laterally extending bracket 44 and is provided at its end with a hand lever 45 for rotating the shaft. This arrangement brings the three operating handles 24, 31 and 45 in proximity so that they may be conveniently operated by the workman in control.

The parts are illustrated in the position occupied preliminary to cracking off a sheet of glass. When the sheet has moved over the table section 2 upon the rollers 36, and the scored line across the sheet arrives adjacent the rear end of the table, the lever 31 is operated to swing the levers 20 forward and cause the table to tilt, thus cracking the sheet off by reason of its weight. The lever 24 is then moved forward swinging the levers 21 forward and carrying the table section 2 forward and downward. The sheet of glass is now substantially level and below the level previous to cracking off. The lever 45 is now swung down to move the connecting rods 38 to the left, which movement transfers the weight of the sheet from the rollers 36 to the rollers 35. As these rollers have their axes arranged radially with respect to the center point 37 of the table, it is now relatively easy to turn the sheet through an angle of 90 degrees so that it is in position for movement to one side of the table and onto the trimming or cutting table. The levers 20 and 21 are now moved still farther to the right carrying the rollers 36 which support the sheet below the rollers 4, 4, 4, etc. carried by the shafts 3, so that the weight of the sheet is transferred to such rollers. The shafts 3 are driven so that when the glass is received upon the rollers 4, it is immediately moved laterally from the table on to the trimming or cutting table lying to the side. This completes the cycle of operation and the table is and the units 33 moved back to their original position by operating the levers 24, 31 and 45. The levers 20 and 21 are yieldingly held in the position shown in Fig. 2 by means of the rods 20$^a$ and 21$^a$ and the springs 20$^b$ and 21$^b$.

What I claim is:

1. The combination with a glass handling table, of a plurality of roller units distributed over the area of the table and each comprising a member carrying two rollers with their axes of rotation at an angle to each other, and mounted to tilt so that in one position of movement of the member, one roller lies uppermost, and in another position of movement, the other roller lies uppermost, one set of said rollers having their axes in parallel with one side of the table, and the other set having their axes arranged radially with respect to a common center located within the confines of the table.

2. Apparatus for cracking off and handling sections of a continuously formed horizontally moving glass ribbon, transversely scored to facilitate cracking off, comprising a table for receiving and supporting a glass section, mounted for vertical movement so that it may be lowered below the level of the continuously formed ribbon causing the section to crack away from the ribbon, and a secondary table below the first table adapted to receive the cracked off section when the first table is lowered and provided with rollers mounted for rotation in planes at right angles to the line of movement of the ribbon, said receiving table being provided with two sets of rollers relatively movable in a vertical direction so that either set may be made to support the glass section, one set of such rollers having their planes of rotation parallel to the line of movement of the ribbon and the other set having their axes disposed radially with respect to a common center located within the confines of the table.

3. Apparatus for cracking off and handling sections of a continuously formed horizontally moving glass ribbon, transversely scored to facilitate cracking off, comprising a table for receiving and supporting a glass section, mounted for vertical movement so that it may be lowered below the level of the continuously formed ribbon causing the section to crack away from the ribbon, and a secondary table below the first table adapted to receive the cracked off section when the first table is lowered and provided with rollers mounted for rotation in planes at right angles to the line of movement of the ribbon, said receiving table being provided with pivoted roller units distributed over the table and each having two rollers, one of which has its axis of rotation parallel to the direction of travel of the glass ribbon, and the other of which has its axis of rotation disposed radially with respect to a center point located in the table, and means for tilting the units so that in one position the rollers having their axes parallel to the line of travel of the glass ribbon are uppermost, and in the other position, the other rollers are uppermost.

4. The combination with a glass handling table, of two sets of rollers carried thereby and relatively movable in a vertical direction, so that either set may be made to support a glass sheet, one set of such rolls having their axes of rotation parallel to one side of the table, and the other set having their axes disposed radially with respect to a common center located within the confines of the table.

In testimony whereof, I have hereunto subscribed my name this 3rd day of June, 1926.

ALBERT E. EVANS.